United States Patent [19]

Gans

[11] Patent Number: 4,558,889
[45] Date of Patent: Dec. 17, 1985

[54] AQUATIC VACUUM HOSE SWIVEL CUFF

[75] Inventor: Leo Gans, Teaneck, N.J.

[73] Assignee: Action Technology, Rockaway, N.J.

[21] Appl. No.: 665,391

[22] Filed: Oct. 26, 1984

[51] Int. Cl.⁴ .............................................. A47L 9/24
[52] U.S. Cl. ..................................... 285/7; 285/275; 285/423; 285/DIG. 4; 285/DIG. 22
[58] Field of Search ................... 285/7, 275, DIG. 22, 285/DIG. 4, 423

[56] References Cited

U.S. PATENT DOCUMENTS

| | | | |
|---|---|---|---|
| 2,260,038 | 10/1941 | Lang | 285/7 |
| 3,167,330 | 1/1965 | Draudt | 285/7 |
| 3,262,718 | 7/1966 | Draudt | 285/7 |
| 3,565,464 | 2/1971 | Wolf | 285/7 |
| 4,099,744 | 7/1978 | Kutnyak et al. | 285/7 |
| 4,345,805 | 8/1982 | Finley et al. | 285/7 X |

FOREIGN PATENT DOCUMENTS

| | | | |
|---|---|---|---|
| 382185 | 10/1932 | United Kingdom | 285/7 |
| 663539 | 12/1951 | United Kingdom | 285/7 |
| 928911 | 6/1963 | United Kingdom | 285/DIG. 22 |

Primary Examiner—Richard J. Scanlan, Jr.
Attorney, Agent, or Firm—Morgan, Finnegan, Pine, Foley & Lee

[57] ABSTRACT

An aquatic vacuum hose swivel cuff coupling comprises, in combination, a blow-molded vacuum hose and a molded swivel cuff. The hose includes one end which terminates as a right cylindrical end portion and a hose ring provided substantially adjacent to the cylindrical end portion whereby a circumferential groove is provided between the cylindrical end portion and the hose ring. The swivel cuff component has a seating portion for receiving the cylindrical end portion of the hose and an annular ring adapted to fit within the circumferential groove of the hose, the annular ring being provided about the hose entrance to the seating portion of the cuff. The cylindrical end portion of the hose is maintained within the seating portion of the cuff by the annular ring being disposed within the circumferential groove whereby the hose may be swivelably rotated within the cuff. The hose end components are extruded with the continuous extrusion blow-molded hose thereby eliminating the need to weld components such as seals.

6 Claims, 5 Drawing Figures

AQUATIC VACUUM HOSE SWIVEL CUFF

BACKGROUND OF THE INVENTION

The invention pertains to vacuum hose swivel cuffs. More particularly, the invention pertains to vacuum hose swivel cuffs for use in swimming pools.

It is known to provide a swivel cuff fitting for effecting a swivelable coupling between a stretch of vacuum hose and a wand or tank of a vacuum cleaner. Vacuum hose swivel cuff couplings typically comprise a combination of a swivel cuff and a hose end wherein the hose end may be swivelably secured within the cuff through the use of circular seals secured to the hose end. The seals thereafter rotate within grooves provided within the cuff to effect swivelable sealing.

Examples of swivel fittings such as may be utilized with vacuum cleaners are illustrated in the U.S. Pat. No. 4,345,805 to Finley et al, (Aug. 24, 1982). Finley illustrates a cuff fitting securing a vacuum hose wherein a corrugated hose is swivelably and pneumatically sealed within the fitting through the use of a sealing surface on the cuff in engagement with a flexible lip at the end portion of the vacuum hose. A ring engageable within the cuff compresses the end portion of the corrugated hose to bias the flexible lip into engagement with the sealing surface of the cuff.

Further references illustrating alternate hose connections include U.S. Pat. Nos. 4,099,744 (Kutnyak et al, 1978), 3,727,949 (Kleykamp et al, 1973), 3,926,222 (Shroy et al, 1975), 3,929,359 (Schmunk et al, 1975) and 3,864,784 (Kilstrom et al, 1975).

Particularly, U.S. Pat. No. 4,099,744 to Kutnyak et al discloses a snap-in swivel end fitting hose wherein each section of hose has a suitable cuff on each end. The hose end fitting is a one-piece molded member having a locking seat and a tapered or a threaded end section. The tapered end section is adapted to be forced into the cuff so as to spread the snap lock on the cuff. U.S. Pat. Nos. 3,929,359 and 3,926,222, on the other hand, utilize cleat-like protuberances to join lengths of hose or pipe. Kleykamp (U.S. Pat. No. 3,727,949) teaches the use of hose convolutes to effect substantially airtight sealing.

Although vacuum hose swivel fittings such as disclosed by Finley et al (U.S. Pat. No. 4,345,805) provide effective, swivelable-sealing coupling between the vacuum hose and wand or tank members, such vacuum hose swivel fittings and hose combinations rely extensively upon the use of welding techniques to attach seal rings to the corrugated lengths of hose end whereby the seal rings may be disposed within grooves provided within the cuff member to effect swivelable sealing connection therebetween. The use of such welding techniques, however, provides a failure point which may, through time, result in a failure of the swivel fitting.

Furthermore, the welding of hose components is an expensive process compared to extrusion blow-molding techniques currently known for the fabrication of vacuum hoses. Such blow-molding fabrication techniques provide lightweight, low cost, crush resistant vacuum hoses which have heretofore not been effectively utilized in combination with aquatic vaccum hose swivel cuff technology. Indeed, all known swivel cuff applications in the pool hose industry have heretofore been provided exclusively on spiral wound hose and have not effectively utilized continuous extrusion blow-molding techniques.

It is therefore an object of the invention to provide a blow-molded hose and swivel cuff coupling for aquatic use.

It is a further object of the invention to provide a swivel cuff fitting for a blow-molded vacuum hose which eliminates the need for welding seals onto the extruded hose end yet retains swivelable engagement between the cuff and the vacuum hose end.

It is a still further object of the invention to provide a vacuum hose swivel cuff coupling which is lightweight, crush resistant and of relatively low cost.

It is a still further object of the invention to provide a vacuum hose swivel cuff which has a reduced incidence of failure.

SUMMARY OF THE INVENTION

These and other objects of the invention are met by providing a vaccum hose and swivel cuff combination including a blow-molded hose which has at least one end which terminates as a substantially right cylindrical end portion and which has a hose ring provided substantially adjacent to the cylindrical end portion whereby a circumferential groove is provided between the cylindrical end portion and the hose ring, and a cuff which has a seating portion for receiving the cylindrical end portion of the hose and a first annular ring adapted to fit within the circumferential groove of the hose, said first annular ring being provided about the hose entrance to the seating portion of the cuff. The cylindrical end portion of the hose is maintained within the seating portion by the first annular ring being disposed within the circumferential groove of the hose. The hose portion may thereby be swivelably rotated within the cuff. The cylindrical hose end and hose ring are extruded with the remainder of the continuous extrusion blow-molded hose thereby eliminating the need to weld sealing portions. The invention, being contemplated for use in swimming pool applications, is not dependent upon airtight sealing to be operative. Thus, by eliminating the need to affix, such as by welding, a sealing mating portion to the hose end for effecting the seal, the entire hose may be continuously extruded by a blow-molding technique and the welded failure point eliminated.

BRIEF DESCRIPTION OF THE DRAWINGS

The invention will be described more fully below by reference to the following drawings, in which.

DETAILED DESCRIPTION OF THE DRAWINGS

Figure 1:
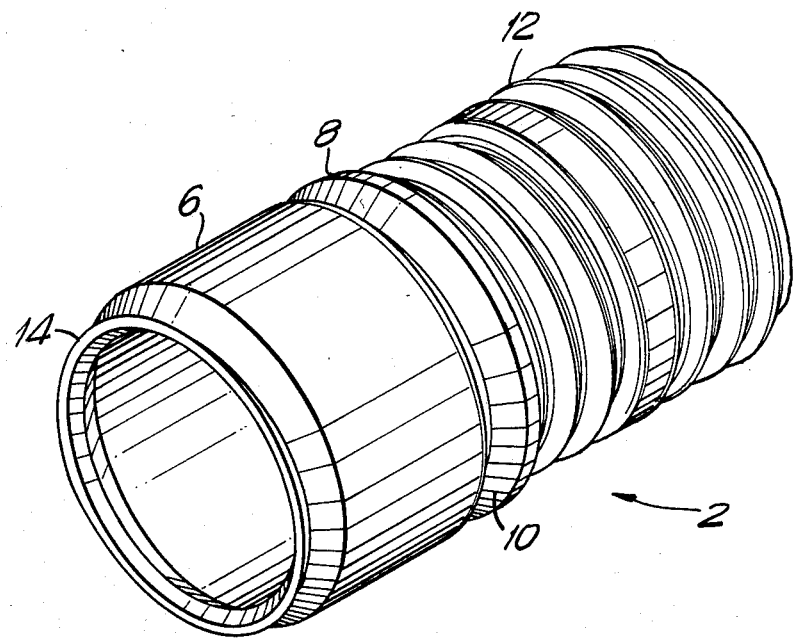
FIG. 1 is a perspective drawing of an extruded hose end such as a swimming pool vacuum hose end.

FIG. 1 illustrates an end of a corrugated length of hose such as may be produced by an extrusion blow-molding process. More particularly, FIG. 1 illustrates a blow-molded swimming pool vacuum hose end having a cylindrical end portion 6 and a ring 8. Cylindrical end portion 6 and ring 8 may be extruded with the remainder 12 of the continuous extrusion blow-molded swimming pool vacuum hose 2. Hose ring 8 is provided adjacent to the cylindrical end portion 6. However, the ring 8 is spaced a distance from cylindrical end portion 6 whereby a circumferential groove 10 is provided therebetween.

As in the embodiment of FIG. 1, a circular sealing lip 14 may be provided about the end of cylindrical end portion 6. As with the remaining components of the hose end of FIG. 1, lip 14 may be continuously extruded therewith.

It is contemplated that the hose of FIG. 1 be fabricated of lightweight flexible plastic such as by the above mentioned widely known blow-molded process. Such blow-molded hose provides a significant weight advantage over previously applied spiral wound hose.

Although the cylindrical end portion 6 is provided of the same flexible plastic as the remainder of the hose of FIG. 1, the non-corrugated nature of this portion imparts a degree of rigidity and strength to this section of the hose end in contrast with the substantially more flexible convoluted portion of the remainder 12 of the hose of FIG. 1.

Figure 2:
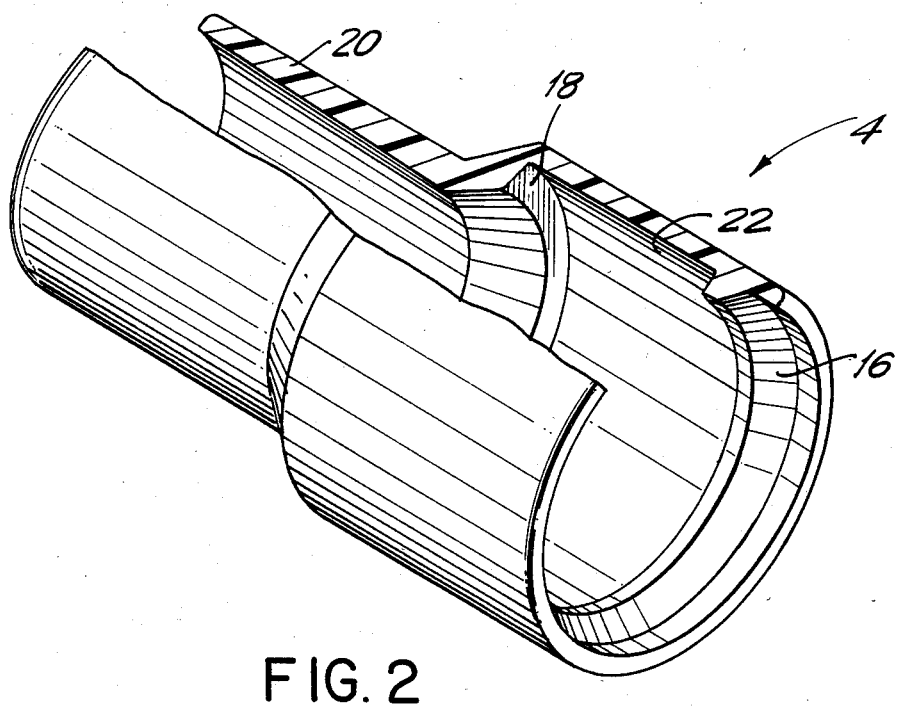
FIG. 2 is a partially cut-away perspective drawing of a swivel cuff such as may provide swivelable coupling in combination with the vacuum hose of FIG. 1 in accordance with the instant invention.

FIG. 2 illustrates a swivel cuff 4 for use in a vacuum hose swivel cuff in accordance with the instant invention. The swivel cuff of FIG. 2 may be molded of plastic or rubber and includes a female end 20 for fitting over, e.g., an underwater vacuum head or brush.

The hose receiving end of the cuff 4 includes an annular ring 16 which traverses the inner circumference of a portion of the cuff 4 of FIG. 2 about the hose entrance thereto. A second annular ring 18 may be provided about the inner circumference of the cuff of FIG. 2 at a distance from the first annular ring 16 and at the injunction between the receiving end of the cuff 4 and the female fitting portion 20 of the swivel cuff of FIG. 2. A seating portion 22 is defined between the first annular ring 16 and the second annular ring 18 for receiving the cylindrical end portion 6 of the hose 2 of FIG. 1.

Figure 3:
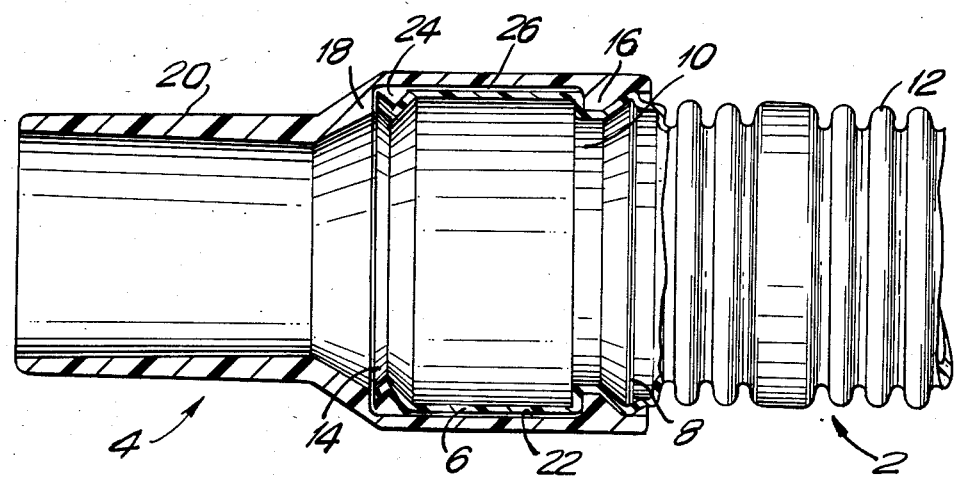
FIG. 3 is a partial cross-sectional view of the hose of FIG. 1 in seating connection with the swivel cuff of FIG. 2.

FIG. 3 illustrates the vacuum hose of FIG. 1 in swivelable seating engagement within the swivel cuff 4 of FIG. 2. Particularly, cylindrical end portion 6 of vacuum hose 2 is shown in seating engagement within the seating portion 22 of the cuff 4.

The inner diameter of the first annular ring 16 is less than the outer diameter of the cylindrical end portion 6 of vacuum hose 2. Thus, to dispose the cylindrical hose end within the swivel cuff 4, it is necessary to collapse, e.g., by "pinching", the cylindrical hose end 6 to pass the same within the first annular ring 16 as the cylindrical hose end 6 is moved into place within the seating portion 22 of the swivel cuff 4.

The first annular ring 16 of the swivel cuff 4 is adapted to fit within the groove 10 provided around the vacuum hose 2 between the cylindrical end portion 6 and the hose ring 8. Thus, while the cylindrical hose end 6 is seated within seating portion 22 of the swivel cuff 4, the hose end is retained in place by the first annular ring 16. However, since the annular ring 16 is adapted to fit within the circumferential groove 10 on the hose end, a swivelable connection is provided therebetween whereby the hose 2 is able to rotate or swivel freely within the cuff 4 while the hose is retained in place.

First annular ring 16 may also serve to provide rigidity to a relatively thin-walled swivel cuff 4 at the point where the cuff 4 mates with the blow-molded hose 2.

Note that a passageway 26 is illustrated between the hose end portion 2 and the swivel cuff portion 4 within the engagement area illustrated in FIG. 3. This illustrates the principle, first exploited with vacuum hose swivel cuffs according to the instant invention, that in an underwater environment, seepage between the hose 2 and the cuff 4 will not adversely affect water suction through the hose 2 during vacuum operation. Since the intended use of the invention is in an aquatic environment such as a swimming pool, it is thus not necessary that an air-tight seal be provided between the hose end 2 and the swivel cuff 4 for the invention to be operable. Since a water-tight seal is not required between the hose 2 and the cuff 4, cylindrical hose end 6 and hose ring 8 may be easily continuously extruded with the remainder 12 of the blow-molded hose 2 without regard to providing a welded seal on the hose to effect a seal between the hose 2 and the cuff 4.

By eliminating the need to provide welded seals to the hose, a potential weld failure point is eliminated. The lack of a sealing engagement within the swivel-cuff further allows easy swiveling of the hose within the cuff since there is reduced friction between the hose and the cuff.

However, the invention also contemplates the provision of a continuously extruded lip portion 14 on a blow-molded hose 2. The blow-molded lip portion 14 may be provided to the end of cylindrical end portion 6 to provide sealing or semi-sealing engagement between the swivel cuff 4, particularly at ring 18, and the remainder of the vacuum hose 2. However, even with the blow-molded lip sealing portion 14 being provided, since the instant invention is intended for aquatic use, it is not necessary that the seal between lip 14 and annular ring 18 be water-tight. Thus, the continuously extruded nature of the blow-molded hose 2 need not be forgone even if a lip sealing portion 14 is provided.

Note that with the lip 14 being provided adjacent the cylindrical end portion 6 within the seating portion 22 of the cuff 4, a toroidal, annular cavity 24 may be formed between the cylindrical end portion 6, the second annular ring 18 and the lip portion 14.

Figure 4:
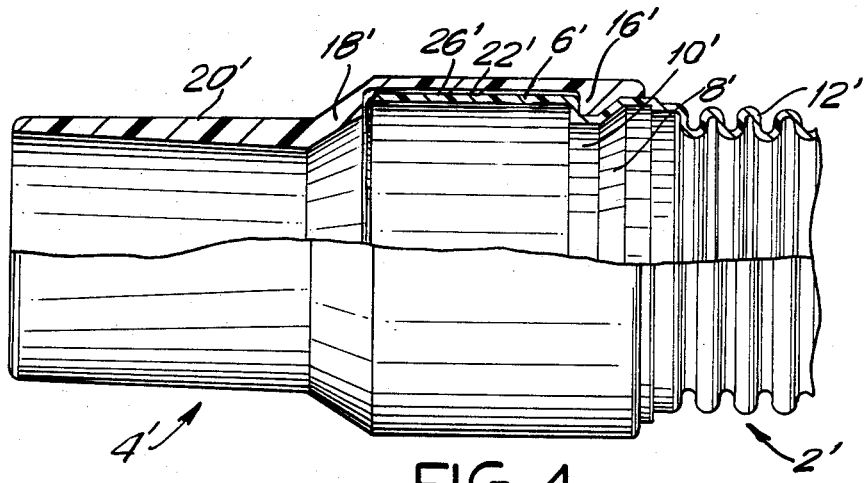
FIG. 4 is a partial cross-sectional view of an alternate embodiment of a swivel cuff hose end according to the instant invention in combination with the swivel cuff of FIG. 2.

FIG. 4 illustrates another embodiment of the instant invention. For convenience of illustration, like components between FIG. 4 and FIG. 3 are similarly numbered, except that the components of FIG. 4 are referenced with the primed numbers of FIG. 3.

The embodiment of FIG. 4 is most notably different from the embodiment of FIG. 3 in that the embodiment of FIG. 4 does not include the lip 14 of the embodiment of FIG. 3. Rather, the cylindrical hose end 6' of FIG. 4 rests within the seating portion 22' of the cuff 4' without being engaged by the second annular ring 18. Thus, as mentioned above, it is not necessary in the practice of the instant invention for a water-tight seal to be provided between the vacuum hose 2' and the swivel cuff 4'. Rather, a lightweight, inexpensive yet crush-resistant vacuum hose swivel cuff assembly may be provided utilizing efficient and inexpensive extrusion blow-molding technology to produce the vacuum hose 2'.

The embodiment of FIG. 4 is also slightly different from the embodiment of FIG. 3 in that, in the embodiment of FIG. 4, the hose ring 8' extends substantially further beyond the swivel cuff 4'. Such extended or widened hose rings 8' may be provided to add additional rigidity or firmness to the swivel cuff coupling at the junction point between the hose and the swivel cuff 4' along circumferential groove 10'.

Figure 5:
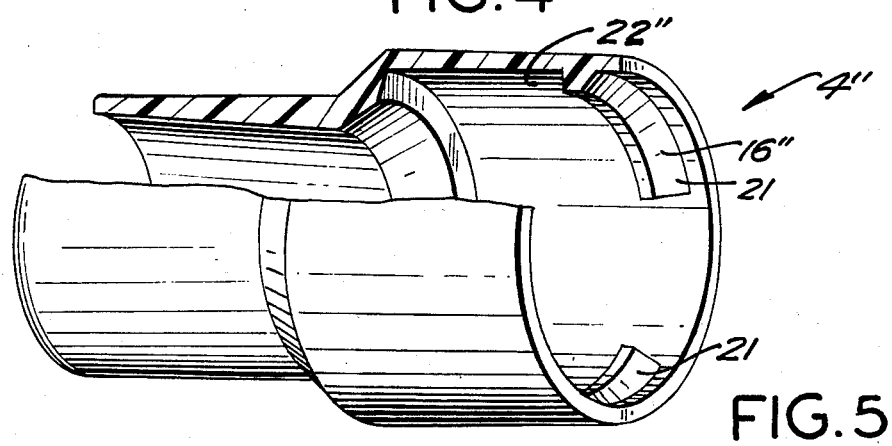
FIG. 5 is a partially cut-away perspective drawing of a swivel cuff wherein the retaining ring about the entrance to the cuff is interrupted, forming lugs thereabout, in accordance with one further embodiment of the invention.

A further embodiment of the invention may easily be envisioned, see FIG. 5, wherein the first annular ring 16" provided about the hose entrance to the seating portion 22" of the cuff 4" is an interrupted ring comprising multiple lugs 21 yet retaining the swivelable characteristics of the afore-mentioned embodiments.

Thus, the instant invention provides an inexpensive, lightweight and crush-resistant vacuum hose and swivel cuff coupling for use in aquatic environments such as in a swimming pool. More particularly, by taking advantage of widely known extrusion blow-molding techniques, and eliminating the need to weld sealing members onto the hose end, the instant invention provides a simple and effective swivel cuff coupling which is not only less expensive than previously known swivel cuffs, but also eliminates the failure points usually present at weld points within welded swivel cuff fittings.

It will, of course, be realized that although the instant invention has been described in great detail according to the embodiments and illustrations provided herein, these illustrations and embodiments should not be deemed to in any way limit the spirit of the invention or the scope of the claims which follow.

I claim:

1. A hose and swivel cuff, comprising, in combination:

a flexible blow-molded hose portion which has at least one end which terminates as a substantially right cylindrical end portion and which has a hose ring provided substantially adjacent to said cylindrical end portion whereby a circumferential groove is provided between said cylindrical end portion and said hose ring; and a molded cuff which has a seating portion for receiving said cylindrical end portion of said hose and a rigid first annular ring adapted to fit within said circumferential groove of said hose, said first annular ring being provided about the hose entrance to said seating portion of said cuff;

wherein the inner diameter of said first annular ring is less than the outer diameter of said cylindrical end portion, the cylindrical end portion of said hose is maintained within said seating portion by said first annular ring being snap-fitted within said circumferential groove such that said hose end is locked in the longitudinal direction within said cuff, and said hose portion is swivelably rotatable within said cuff and water may seep around the outer circumference of said cylindrical end portion and into said cuff.

2. The hose and swivel cuff combination of claim 1, wherein said cylindrical hose end and said hose ring are integrally blow-molded with the remainder of said blow-molded hose end portion.

3. The hose and swivel cuff combination of claim 2 wherein said hose ring extends outside of said cuff.

4. The hose and swivel cuff combination of any of claims 1, 2 or 3 wherein said cuff includes a second annular ring spaced forward a distance from said first annular ring, the area within said cuff between said first and second annular rings defining said seating portion.

5. The hose and swivel cuff combination of claim 4 wherein said cylindrical end portion includes a blow-molded annular lip extruded with said blow-molded hose and extending forward of said cylindrical end portion about the edge thereof, the outer diameter of said lip being less than the outer diameter of the remainder of said cylindrical end portion and wherein said lip substantially abuts said second annular ring leaving a toroidal circumferential cavity between said cylindrical end portion, said lip and said second annular ring.

6. The hose and swivel cuff combination of claim 5, wherein said first annular ring is an interrupted ring.

* * * * *